United States Patent
Sartain et al.

[11] Patent Number: 6,124,854
[45] Date of Patent: *Sep. 26, 2000

[54] INTERACTIVE VIDEO SYSTEM

[75] Inventors: E. Paul Sartain, Key Biscayne; Ronald Arthur Linares, Boca Raton; Armondo R. Rivero, Miami, all of Fla.

[73] Assignee: The Box Worldwide LLC, Miami Beach, Fla.

[*] Notice: This patent is subject to a terminal disclaimer.

[21] Appl. No.: 08/975,529

[22] Filed: Nov. 20, 1997

Related U.S. Application Data

[63] Continuation of application No. 08/646,645, May 3, 1996, abandoned, which is a continuation-in-part of application No. 08/610,827, Mar. 7, 1996, abandoned, which is a continuation-in-part of application No. 08/438,040, May 8, 1995, Pat. No. 5,914,712.

[51] Int. Cl.[7] .................................................. H04N 7/173
[52] U.S. Cl. ................................ 345/327; 348/7; 455/4.2
[58] Field of Search ........................ 455/5.1, 4.2; 348/12, 348/13, 7; 345/327; 395/200.48, 200.49; H04N 7/16, 7/173

[56] References Cited

U.S. PATENT DOCUMENTS

| | | | |
|---|---|---|---|
| 5,089,885 | 2/1992 | Clark | 348/12 |
| 5,357,276 | 10/1994 | Banker et al. | 348/12 |
| 5,424,770 | 6/1995 | Schmelzer et al. | 348/9 |
| 5,550,577 | 8/1996 | Verbiest et al. | 348/10 |
| 5,600,364 | 2/1997 | Hendricks et al. | 348/9 |
| 5,914,712 | 6/1999 | Sartain et al. | 345/327 |

OTHER PUBLICATIONS

Anders Klemets "The Design and Implementation of a Media on Demand System for WWW", pp. 1–10, 1994.

*Primary Examiner*—Chris Grant
*Attorney, Agent, or Firm*—Townsend and Townsend and Crew LLP

[57] ABSTRACT

The present invention distributes digital video programs to a predetermined group of subscribers. The video programs are converted into a digital format in a central site (100) and then distributed to a remote site (110). Identification information for the digital video programs is broadcast to the group of subscribers. Each of the subscribers has the option of selecting one of the digital video programs for broadcast to the group. A continuous program which includes the digital video programs is broadcast to the group of subscribers or displayed on televisions (130–133). The order of the selected digital video programs within the continuous program is based at least in part on when the subscriber selections are received.

38 Claims, 8 Drawing Sheets

INTERACTIVE VIDEO SYSTEM

CROSS REFERENCE TO RELATED APPLICATIONS

This application is a continuation application of U.S. patent application Ser. No. 08/646,645, filed May 3, 1996, now abandoned, which is a continuation-in-part of U.S. patent application Ser. No. 08/610,827, filed Mar. 7, 1996, now abandoned, which is a continuation-in-part of U.S. patent application Ser. No. 08/438,040, filed May 8, 1995, now U.S. Pat. No. 5,914,712, the disclosure of which is incorporated herein by reference in their entirety for all purposes.

BACKGROUND OF THE INVENTION

The present invention relates generally to a method of displaying subscriber selected video information on a television. More particularly, the present invention relates to a method of operating a system wherein remotely selected video information is broadcast to all television receivers in a predefined group. Subscribers can view the selected video information by tuning to a predetermined channel. The selection occurs using a telephone or a remote control at the viewer's location. The information is retrieved from its storage location, and then the video selection is broadcast to all the television receivers of subscribers within the predefined group.

One type of video system allows a subscriber to view selected video information on cable television. These systems are often referred to as pay-per-view video systems. For example, a subscriber may be provided with a switch or controller by which the subscriber can choose to view free television, listen to music, or view pay television. Other systems allow for the insertion of advertisements into video programming. These systems are identified as Digital Video Ad Inserters and they are provided commercially by, for example, TEXSCAN and STARNET.

Other systems allow a subscriber or viewer to select and view video information that will be broadcast to all subscribers or viewers on one common channel using only a conventional television receiver and a telephone having a touch tone keypad. These systems allow for remote diagnosis, operation, and control. Such remote capabilities enable, for example, the receipt of a dedication forwarded from a central or host station to be displayed on a broadcast from a particular remote system location. In addition, these systems can utilize an audio track from one source and video information from another source, placing them both on the outgoing line for display on each viewer's television receiver.

Thus, a subscriber can select video information to be broadcast to all subscribers/viewers on one common channel using only a conventional touch tone keypad or telephone including such a keypad. These systems are set forth in more detail in U.S. Pat. Nos. 5,089,885, 5,019,900 and 4,761,684. U.S. Pat. Nos. 5,089,885, 5,019,900 and 4,761,684, incorporated herein by reference for all purposes, respond to the need for an effective and cost-efficient group-oriented interactive video system. These patents provide methods and apparatus for operating a cable television system wherein a subscriber can select video information to be displayed on a common channel of the televisions of all subscribers. The systems described in these patents have met with substantial success and are pioneering in the field of group-oriented, interactive video systems.

SUMMARY OF THE INVENTION

The present invention responds to the need for a more effective, cost-efficient, group-oriented, interactive video system. In one embodiment, the invention distributes video programming from a central location to remote sites and then broadcasts selected video programs from the remote sites to a predefined group of subscribers. This group of subscribers can then view the video programs on their televisions and/or computers. In the present patent application, subscriber refers to any consumer who receives the selected video programming. The individual consumer can control which of a plurality of video programs is broadcast to the predefined group of subscribers.

The present invention provides a method and apparatus for distributing video programs to a predetermined group of subscribers. The video programs are converted into a digital compressed format and then distributed to a remote site. Identification information for the digital video programs is broadcast to the group of subscribers. Each of these subscribers has the option of selecting one of the identified digital video programs for broadcast. A continuous program which includes the selected digital video programs is broadcast to the group of subscribers. The order of the selected digital video programs within the continuous program is based at least in part on when the subscriber selections are received.

A further understanding of the nature and advantages of the invention may be realized by reference to the remaining portions of the specification and the drawings.

DESCRIPTION OF SPECIFIC EMBODIMENTS

Figure 1:
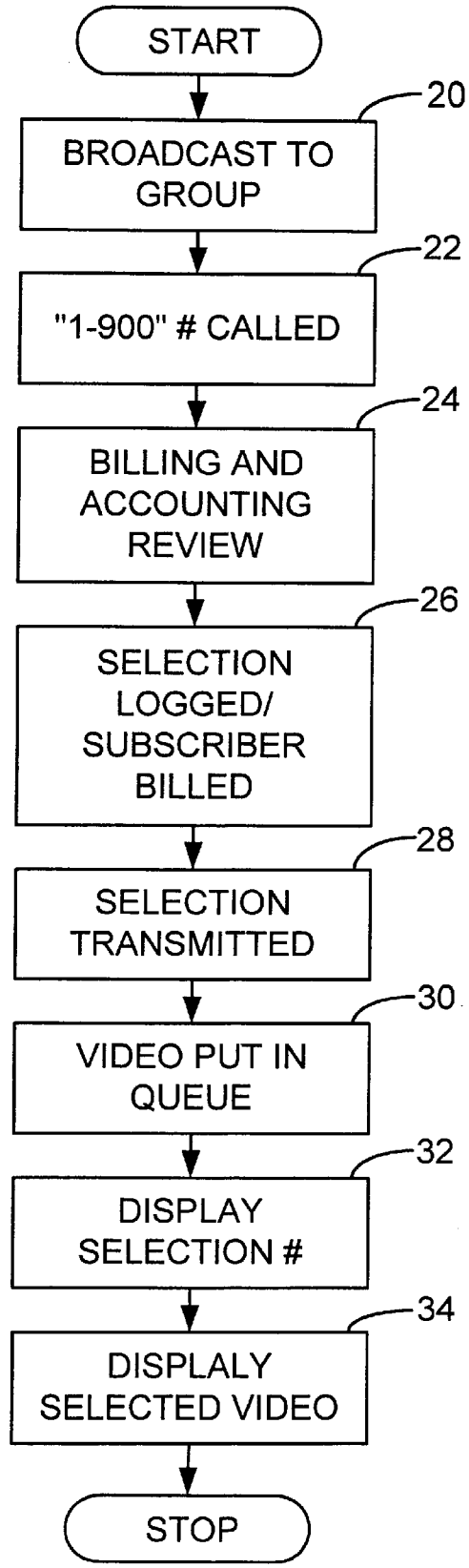
FIG. 1 illustrates the overall operation of the system in one embodiment.

In a specific embodiment, the present invention provides an arrangement for distributing selected digital video programs to a predefined group of subscribers. The group of subscribers are usually defined as a group of consumers which receive a common television channel. For example, a group of subscribers in the city of Miami, Florida may receive channel 2 which provides the selected video programs. The subscribers in this group can select video programs for display on channel 2. In a specific embodiment, the selecting of video programs is done with either a telephone or other remote control device. In another specific embodiment, video programs may be selected over the Internet via, for example, a "web page" on the World Wide Web.

If a telephone is used for selecting, then a touch-tone telephone keypad used in conjunction with, for example, a "1-800" or a "1-900" telephone number is utilized in a specific arrangement. For example, one "1-900" number associated with one of the predefined subscriber groups is displayed on a common channel to that group. When a subscriber in that subscriber group dials that "1-900" number, the call is automatically routed to a central location. The central location then interacts with the calling subscriber such that the subscriber can use their touch-tone telephone keypad or otherwise select an available video for broadcast to the subscriber group. When a video is selected for broadcast, information indicating that selection is sent to the remote site associated with the selecting subscriber. For example, a cable provider located in Denver may provide selectable videos on channel 4. This channel 4 could be broadcast to any predefined group of subscribers in the Denver area (e.g., to a specific Denver suburb). Subscribers who receive this channel 4 also receive information on how to select available videos. For example, a "1-800" number along with a video identification number may be provided within the broadcast program. When a subscriber calls this "1-800", the subscriber is routed to a central office in, for example, Miami. The calling subscriber can then select a desired video program by providing the office in Miami with the identification number of that desired video. The selection information is then transmitted to the Denver cable provider such that it can be used to provide the selected video program for broadcast on channel 4.

Therefore, the videos which are available for broadcast are listed on the common television channel for each subscriber group. Each available video has an associated identification number to facilitate the automatic ordering of these videos, and this identification number is displayed, for example, in a scroll bar within the current video program. Multiple "1-800" and/or "1-900" numbers can be used for different selection types (e.g., for regular selecting, for the selection of multiple videos at one time, for promotional activities, for ordering video-related products, etc.). In a specific embodiment, the scroll bar is used to provide the titles of available video programs along with their identification numbers to subscribers. This scroll can provide additional information such as (1) information related to the video which is being broadcast, (2) advertisements of any type, (3) trivial and factual information (preferably related to music), (4) news-type information, and (5) additional information related to the video programs available for selection. According to another specific embodiment, all of this information is provided to subscribers on an Internet site such as, for example, a "web page" on the World Wide Web.

In one embodiment, the automated voice response can utilize the voice of the artist on the identified video. For example, if a subscriber calls and selects a "Rolling Stones" video, the automated answering system can respond with Mick Jagger's voice, thanking the subscriber for the selection. Moreover, the automated voice response can be available to the subscriber in multiple languages. In a specific embodiment, different languages are available to the caller when the associated group of subscribers is located in an area which uses multiple languages. For example, the system may provide different phone numbers for different language services. Alternatively, the system's first selection with a touch-tone phone may be a language selection, in which case the rest of the remote selection session takes place in the selected language. Under the latter circumstance, when a subscriber dials a phone number for access to the remote site, the subscriber is immediately given the choice for proceeding in one of multiple available languages.

When a telephone is used for ordering videos, that telephone can be located within or away from the broadcast receiving site (i.e., any remote pay-phone or the like can be used to order videos). When the telephone used for ordering a video is located away from the subscriber's home, the subscriber may provide a credit card number or some other type of account number for payment. For example, a special debit card can be issued for this purpose. If a credit card number is used, the charge for the video program selection is put on the subscriber's credit card.

In some embodiments, a prompt on the telephone automated voice may transfer a subscriber to a merchandising section which allows the subscriber to purchase, for example, video-related products. In this arrangement, before or after a video has been selected, the automated voice response may ask the caller if they are interested in purchasing merchandise. The type of merchandise may or may not be set forth in the initial voice prompt. According to one embodiment, if the caller indicates, via their touch-tone telephone, an interest in possibly purchasing merchandise, the caller is transferred to a different automated voice which presents the available merchandise, the associated prices, the method of payment, shipping information, etc. In an alternative embodiment, the caller may be transferred to an individual in the central location who can take the merchandise order. According to another alternative embodiment, the caller may be transferred to an operator at a related merchandising service such as, for example, 1-800-MUSIC-NOW.

Figure 2A:
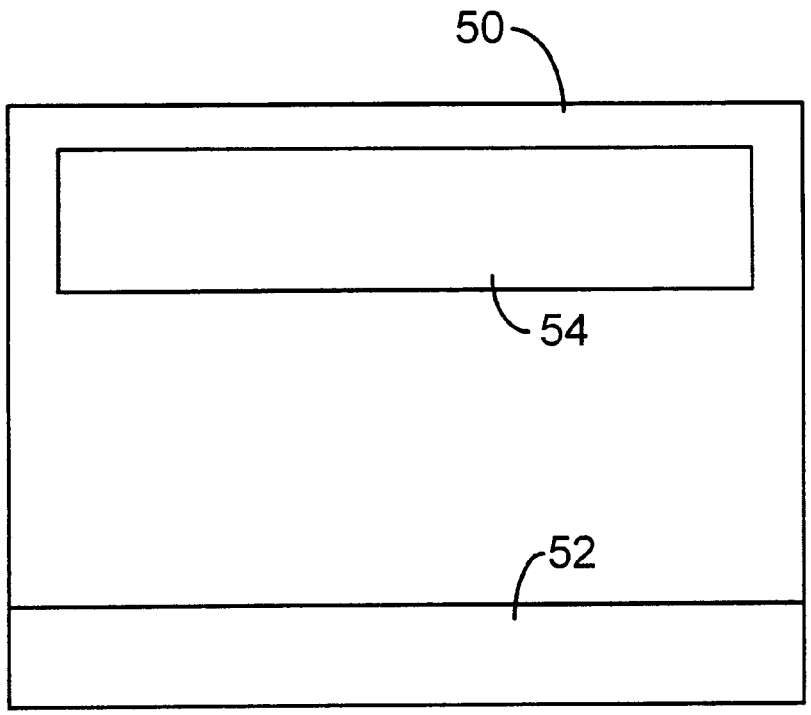
FIG. 2A illustrates a typical subscriber's television display according to a specific embodiment of the invention.

FIG. 1 illustrates the overall operation of the system in one embodiment. In step 20, a continuous video program is broadcast to a group of subscribers from a remote site (e.g., cable television location), as shown in FIG. 2A. FIG. 2A illustrates a typical subscriber's television display 50 in which the names of the available video selections along with video identification numbers are scrolled across the bottom of television screen 50. Scroll 52 may include a "1-800" number or "1-900" number. Alternatively, these telephone numbers may be located within a different field 54 in television display 50. Field 54 may also be employed to display the request number of the currently playing video when, for example, the video is beginning and/or ending. When the request number is not being displayed, other information such as the logo of the system service provider may be displayed. In addition, information related to the current video on television screen 50 may also be located within field 54.

Figure 2B:
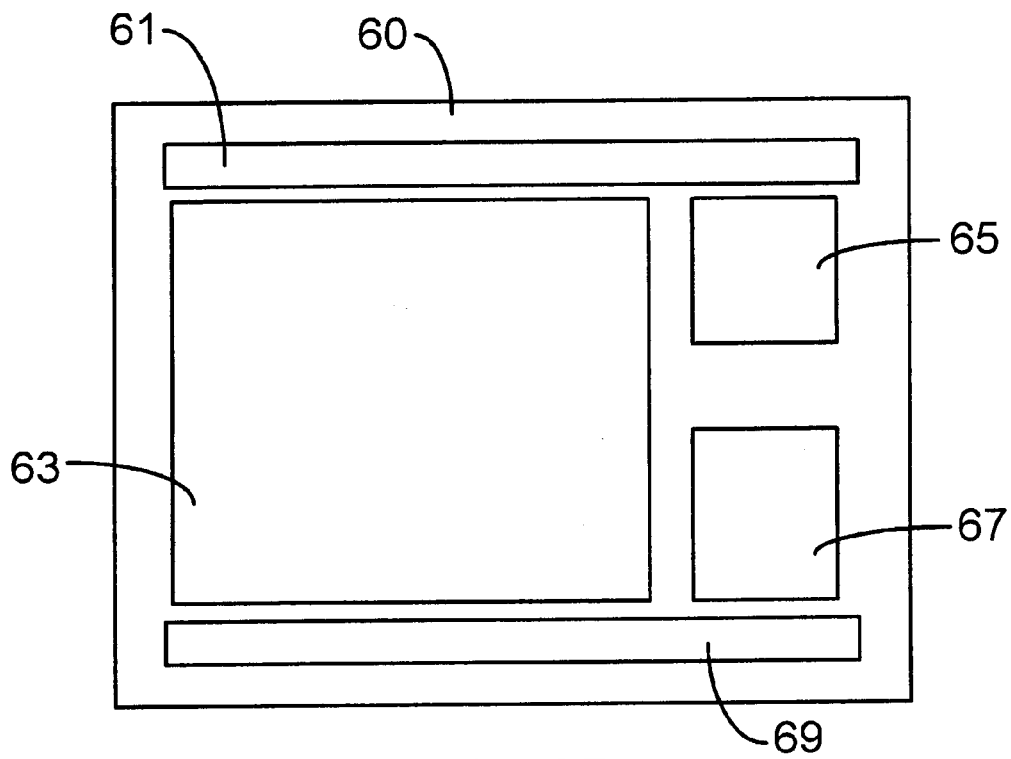
FIG. 2B illustrates a typical subscriber's computer display screen according to a specific embodiment of the invention.

FIG. 2B illustrates a specific embodiment of the computer display screen of a subscriber who gains access to the system over the Internet. Display window 60 is a Windows 95 style frame which encompasses a plurality of different fields 61–69. Alternatively, no frame or window is required and fields 61–69 are simply distributed on the computer display screen as shown. Field 61 is operable to display promotional information but may also be transparent to the user. Field 63 is operable to display resized live video with or without a border. Field 65 is operable to display station identification and/or promotional information. Field 67 is operable to display information concerning ordering merchandise, selecting videos, or other promotional information. Field 69 is operable to display information concerning currently available videos, selecting videos, ordering merchandise, or other promotional information. Like field 61, fields 65, 67 and 69 may be selectively rendered transparent to the user.

According to an alternative embodiment of the invention, data may be inserted into the vertical blanking interval of the video signal for transmission to subscribers. This data may be received by a group of subscribers using a data reception unit for vertical blanking interval (VBI) data. The data reception unit may be integrated into the subscribers, televisions or personal computer. An example of such an integrated unit is currently available from Norpak Corporation. Alternatively, the data reception unit may be a separate outboard unit.

The content of the received data may be of general interest or may be tailored for specific subscriber groups. Such specifically tailored data might include a list of video selections available to a subscriber group, information directly related to the currently playing selection, or information related to commercial advertisers or sponsors. The format of the received data may include textual and/or graphical elements. Additionally, the received data may include higher level data structures such as, for example, digitized audio files or executable files. According to a specific embodiment, video text is provided on background menus (also referred to as teletext). In this arrangement, the user can switch between a television display with videos and a television display of background menus. The background menus can include the scroll information, and a user can flip through these background menus (also referred to as pages of teletext) with a commercially available remote control. In yet another embodiment of the present invention, scroll information is placed on a second audio channel. According to another specific embodiment, an Intercast system is employed in which data transmitted by the Intercast system is interpreted by the receiving unit as Internet-related data. The receiving unit then searches the Internet for additional information related to the received data. Intercast system technology is commercially available from Norpak Corporation and Gateway 2000.

In step 22 of FIG. 1, a subscriber calls a "1-900" number to request that a desired video program be played. Before the call is answered at the system's central or local location, a billing and accounting review takes place with reference to the caller's phone number to check the caller's credit history and to prepare for billing the caller should a selection ultimately be made (step 24). In step 26, the telephone call is answered and the subscriber is prompted to input a selection number, such as "234". This subscriber selection is then logged at the central or local location at which point the subscriber is also billed. This log includes various information, such as the subscriber selection time, the selection number for the desired video program, the identification number for the selecting subscriber, etc. In step 28, the selection is transmitted to, for example, the cable television service provider. In step 30, the requested video program is placed in a queue. In step 32, the subscriber's selection number is displayed on scroll 52 within television screen 50, to provide quick feedback to the selecting subscriber. In step 34, the selection moves to the top of the queue and is played on the relevant cable television channel.

A remote control can also be used by a subscriber to select an available video for broadcast. In a specific embodiment, this remote control is used in conjunction with a two-way cable box (or other set-top device) located in the subscriber's home, or in conjunction with a bi-directional satellite system owned by the subscriber. Again the subscriber enters information in response to prompts provided by the remote site for that subscriber's predefined group. These prompts are provided on the subscriber's television. If a set-top device is used, as the subscriber responds to prompts on the television, signals received in the two-way box from the subscriber's remote control are sent to the subscriber's cable company via return transmission (e.g., RF transmission, fiber-optic transmission, etc.).

If the cable company is the remote site, the selected video is directly placed in the queue for the selecting subscriber's group. The cable company also provides the information received from the subscriber to the central location for tracking purposes. A set-top device, such as a standard two-way cable box, available from any cable company is capable of performing this function. If the cable company is not the remote site for the selecting subscriber, the received video selection information is transmitted from the cable company to the remote site (i.e., when a satellite is used as a remote site). If a cable company is used as the remote site, the cable company can provide for the accounting/billing associated with that request. Thus, the charge for the selection can be included in the subscriber's cable bill. The prompts provided to the subscriber who is selecting a desired video are available from, in a specific embodiment, software located in the two-way cable box.

The present invention can deny a request for a video program for a variety of reasons such as, for example, when the selecting subscriber has failed to pay for previous selections, or when the selecting subscriber has previously requested that programs or channels containing particular types of subject matter be blocked from that subscriber's set. When a telephone at the subscriber's home is used to request a video, the caller's telephone number is provided to the central location. The system at the central location maintains a list of telephone numbers and account codes associated with subscribers who have previously not paid for video selections or who are not permitted to make requests for any of a number of other reasons. If the caller's telephone number or account code matches one of these stored telephone numbers or account codes, the selection is refused. Alternatively, each subscriber may have an associated subscriber number used when ordering videos with a remote control, with a telephone located away from the subscriber's home, over the Internet, etc. This subscriber number can be used in the same way as the caller's telephone number for denying requests. Similarly, an account limit may be placed on each subscriber caller. This account limit may depend on the payment history of the caller. For example, a caller who has continually paid bills on time may have a $200 account limit, and a caller with no payment history may have a $100 account limit. When a caller reaches this account limit, the caller's request(s) are denied. Software located in, for example, the central location monitors the subscribers' payment histories and controls the denying of video program orders.

One of the advantages of the present invention is its ability to tailor the available video programming to the tastes of the subscribers in a particular group. For example, if a specific group of subscribers continually selects alternative-type music, then more videos which provide alternative-type music can be made available as videos for selection in that group. Additionally, this invention allows for certain commercials to be provided to subscriber groups located in areas which respond better to a certain type of commercial. Thus, commercials can be tailored for a certain group, and then inserted into the continuous video program being broadcast to that group. In this situation, the commercials can be updated through a satellite. Moreover, software can be used to automatically determine which types of videos are preferred by a particular subscriber group. In this arrangement, an algorithm is used to collect information and to determine the frequency of selection for each type of available video. When subscribers in the group continually select a certain type of video for display, software will automatically provide more videos of that type for selection to the subscriber group.

In a specific embodiment, the overall system controls approximately 1800 video programs. Approximately 150 to 300 videos are selected for display at any point in time within the system. When a video is selected for display, that video is placed in a queue which includes all the videos which were selected prior to that subscriber's selection. As each video is selected for broadcast, it is placed in that subscriber's queue such that the order of videos within the queue is usually based on when each of the videos was selected. For example, if video no. 1 is selected before video no. 2, then video no. 1 is usually played ahead of video no. 2 to the group associated with the selecting subscribers. Other considerations can affect where a video is placed in the queue. For example, when a queue is built, the following may be taken into consideration: (1) diversity of the videos being broadcast, (2) the time length of the selected video, (3) the money amount paid by the subscriber for the selected video, (4) the demographics of the subscriber group, (5) the number of subscribers who have selected the video, etc. Thus, the queue may be reordered when more than one person selects the same video. In this arrangement, a video which is already in the queue and then is selected by another subscriber, is moved forward in the queue such that it is played earlier than some of the videos which were selected before it. This arrangement satisfies more subscribers more quickly when the queue is particularly long.

Figure 3:
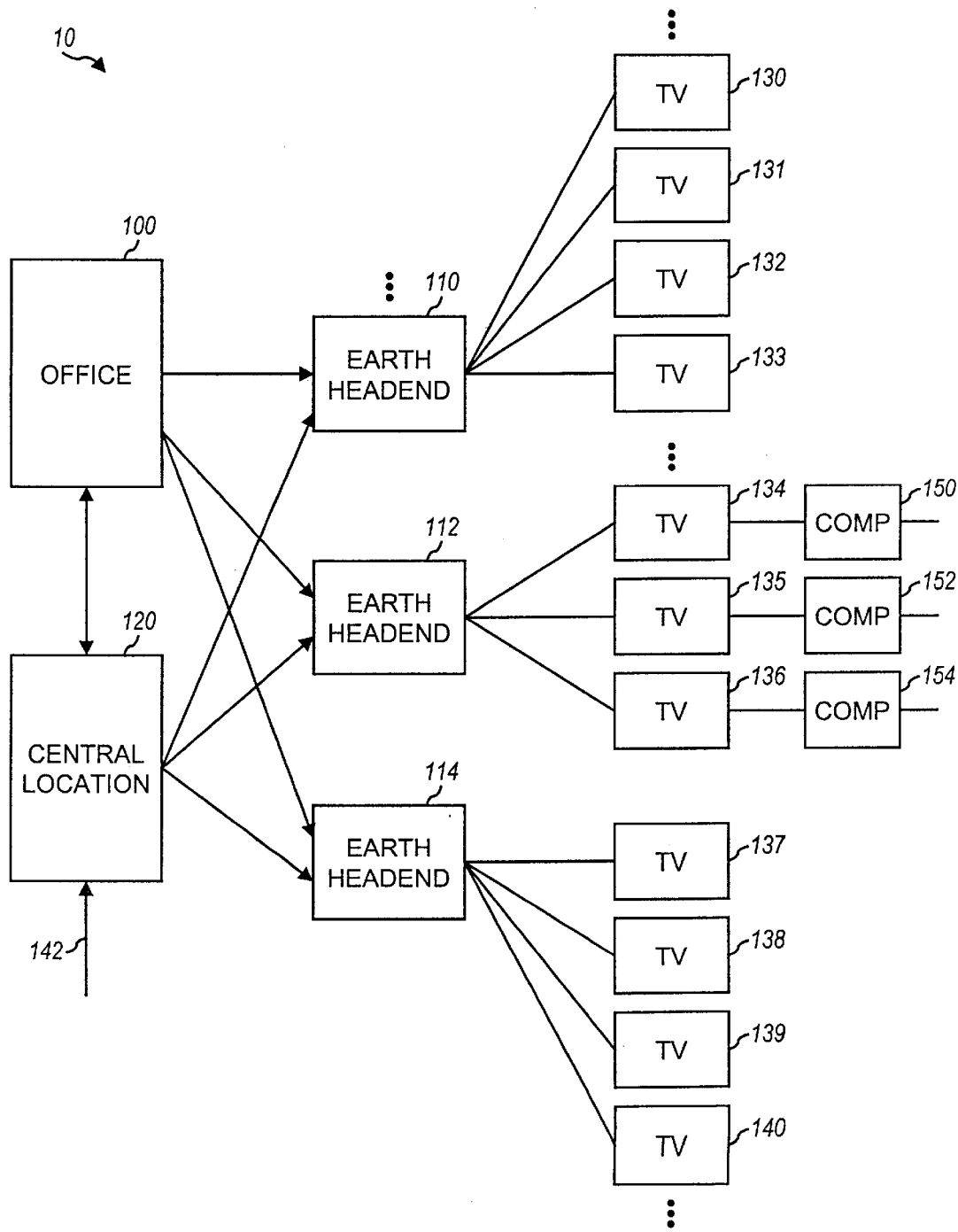
FIG. 3 illustrates the overall system structure of a first embodiment.

A remote site is referred to herein as an earth headend when a satellite is not used to provide video directly to a subscriber group. When a remote site is a satellite which provides videos directly to a subscriber group, that remote site is referred to as a satellite headend. FIG. 3 illustrates the overall system structure of a first embodiment. In this embodiment, the central site includes both office 100 and central location 120. Additionally, earth headend 110 provides a local television channel with selected video programs to an associated subscriber group.

In one embodiment, office 100 and central location 120 perform separate and independent functions. For example, office 100 may compile all of the necessary/desirable video programs for distribution to the remote sites 110, 112 and 114. The video programs then become selectable video programs. In contrast, central location 120 may have different and separate functions. Central location 120 may receive selection information from any one of the subscribers within the multiple subscriber groups and provide that selection information to the earth headend or satellite headend associated with the subscriber who made the selection. For example, central location 120 may receive a "1-900" call from a subscriber. If this occurs, central location 120 provides the necessary prompts such that a video can be selected. Central location 120 then provides the selection information to the appropriate earth headend or satellite headend via, for example, a modem. In addition, central location 120 can track the demographic information described above. This demographic information can then be provided to office 100 so that it can be used for determining which available video programs to provide to each subscriber group. When central location 120 works in conjunction with office 100, all the information within central location 120 is digitized and relayed to office 100 such that communication between office 100 and central location 120 is complete. In an alternative embodiment, central location 120 processes all of the telephone calls and configures all videos in the queue. In some embodiments, the telephone calls are processed using an interactive voice response system. In other embodiments, live operators are employed to perform these functions.

Each earth headend 110, 112, and 114 provides selected programs to each associated group of televisions 130–133, 134–136, and 137–140 which are located in the subscribers' homes. In this example, televisions 130–133 belong to subscribers in one of the predefined groups. Earth headends can be added to and/or subtracted from the system just as televisions can be added to and/or subtracted from each group of televisions being supplied with video programming from these earth headends 110, 112 and 114. Thus, any combination of earth headends and televisions can be put together in the present invention. A group of subscribers can easily be defined as the group which receives video programming from a specific earth headend 110, 112, or 114. This allows for significant flexibility in the arrangement of subscriber groups. For example, one block on a street can form a subscriber group. Moreover, a group of subscribers can include a group which speaks a language different from that of another group such that videos can be broadcast in the language of each subscriber group. In one embodiment, each earth headend is placed at a cable company location and is used to provide a single channel in that company's service region.

In operation, earth headend 110 provides a channel with continuous video programming to subscribers in the subscriber group with televisions 130–133. This continuous video programming provides selected video programs along with a scroll. This scroll provides information related to selectable videos (e.g., video title, video identification number, and "1-900" number for selecting the video). The subscribers with televisions 130–133 can select these selectable videos by calling the "1-900" number in the scroll. The calling subscriber is then routed to central location 120 via telephone line 142. Central location 120 provides the automatic voice responses set forth above. Central location obtains the selection information and transmits it to office 100. Office 100 then sends the selection information to earth headend 110, and earth headend 110 inserts the selected video into its queue. Alternatively, central location 120 can provide the selection information to both office 100 and earth headend 110. Again, earth headend 110 inserts the selected video into its queue for the subscriber group with televisions 130–133.

Computers 150, 152 and 154 are coupled to televisions 134–136 and can be used in conjunction with the internet to select videos or to view selected videos. In one arrangement, viewers/subscribers can select programs for broadcast on their common television channel via the internet as described above. The associated prompts for selecting video programs are provided through the internet. These prompts can be viewed on either the subscriber's computer monitor or television (when the television is coupled to the computer monitor). In another arrangement, after the digital video is selected, the subscriber can view the digital video on the subscribers' computer screen via the internet. The selected video is also displayed to all the other subscribers in the selecting subscriber's internet group. Office 330 monitors all activity on internet via gateway 610, interactive-voice response (IVR) 600 and internet connection 650 (see FIG. 6). In order to provide video program on the internet, the programs are compressed and sent over the internet via a high-speed T1-type access through internet 650. In a specific embodiment, thirty frames/second are provided to the subscriber's internet group such that a good quality display of the video program is provided. High speed access is also available via a modem on a cable line with high band width.

Figure 4:
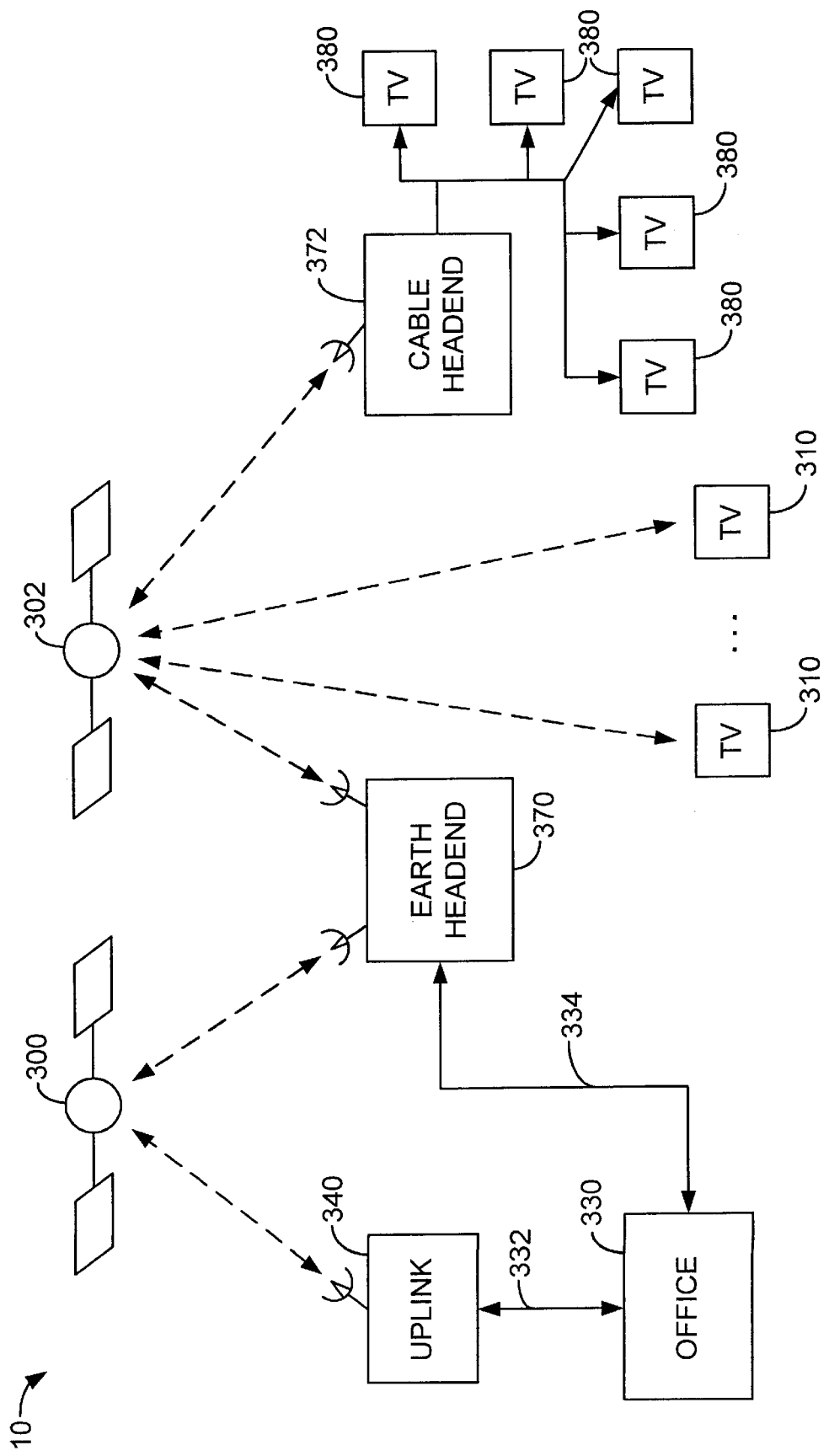
FIG. 4 illustrates the overall system structure for a second embodiment which utilizes a satellite.

FIG. 4 illustrates the overall system structure for additional embodiments which utilizes satellite communications. In one embodiment of the present invention, all of the functions performed in the central site are combined into one office 330. Office 330 in conjunction with uplink 340 provides video programs via data satellite 300 to an earth headend 370. Video is digitized and compressed within office 330 and then sent to uplink 340 via line 332. This video is placed in a file with an address header. The address in the header is used for sending the videos to the headends. According to a specific embodiment, each remote site (e.g., earth headend) has a unique four letter code with an additional letter in the header designating a particular hard drive at the remote site. To send a particular video to a group of remote sites, a list of remote sites (including a designated hard drive) is compiled and associated with the video's file name. This distribution list is sent to and used by the satellite uplink and the remote receiver. Alternatively, the distribution list is used as input to facilitate network file transfers or data tape dubbing depending upon the video transport scheme being used. Videos may be deleted by sending a network message or by modifying a remote database to indicate that a particular video file may be deleted from a particular hard drive.

Uplink 340 then takes the information provided by office 330 and provides it to data satellite 300. Therefore, uplink 340 is a satellite transport station. Data satellite 300 then transmits the information to earth headend 370 which, in turn, transmits the information to skybox satellite 302. However, before sending the compressed video programs to skybox satellite 302, earth headend 370 converts the digitized/compressed video programs into an analog format required by skybox satellite 302. According to various embodiments, skybox satellite 302 may send the video programs either directly to televisions 310 on a common channel, or to cable headend 372. It will be understood that the system configuration 10 shown in FIG. 4 is a combination of different system features which may be used independently as well as in a variety of other combinations. For example, data satellite 300 may be used with the system of FIG. 3 to link office 100 and central location 120 with earth headends 110, 112 and 114. Moreover, skybox satellite 302 may be used in either or both of its transmission capacities to provide communications between earth headends 110, 112 and 114 and televisions 130–140.

If skybox satellite 302 is transmitting directly to subscribers, the subscribers with televisions 310 all receive the same selected video programming on a single common channel provided by skybox satellite 302. For example, skybox satellite 302 may provide selected video programming along with available program identification numbers to a group of fifty subscribers who receive this information on channel 4 of their televisions. Direct satellite transmission to subscribers has several advantages and disadvantages when compared to a cable headend system. First, direct satellite transmission can provide selectable video programming to subscribers which do not have access to a similar channel available through cable or a similar arrangement. Second, direct satellite transmission can easily reach a much larger number of subscribers. Unfortunately, as the number of subscribers increases, the waiting period for a selected video increases. For example, a subscriber who belongs to a large subscriber group may have to wait twelve hours before their selected video is aired on the channel provided by skybox satellite 302. In contrast, a cable headend usually provides selectable video to a smaller group of subscribers such that a selected video may be played almost instantly during unpopular television viewing times. Because selected videos are placed in a queue, the waiting period for viewing a selected video is longer when more videos are being selected. Furthermore, on the average, more videos are selected when a greater number of subscribers is included in a predefined subscriber group.

In operation, when skybox satellite 302 transmits directly to subscribers, it broadcasts a channel with continuous video programming to subscribers in the subscriber group with televisions 310. As in FIG. 1, this continuous video programming provides selected video programs along with an information filled scroll. The subscribers with televisions 310 can select videos by calling the "1-900" number in the scroll, and the calling subscriber is then routed to office 330. In this arrangement, office 330 provides the automatic voice responses and obtains the selection information. Office 330 then sends the selection information to skybox satellite 302 (via uplink 340, data satellite 300 and earth headend 370), and skybox satellite 302 inserts the selected video into its queue. Thus, when the selected video reaches the top of the queue, it is broadcast in the continuous program to the subscriber group with televisions 310.

Skybox satellite 302 can also be used to transmit video programs to cable headend 372. Cable headend 372 then broadcasts continuous video programs to subscribers with televisions 380. When a satellite is not utilized to distribute the video programming, a variety of other techniques can be used. For example, tapes (including VCR tapes and high capacity data tapes) and/or disks (including floppy disks and laser disks) which include the video programs can be sent, in a specific embodiment, via overnight mail to headends 110, 112, 114, 370, and 372. In addition, the video programs can be sent via any available transmission line means (e.g., telephone line, coax cable, fiber optic cable, the Internet, and the like). In a specific embodiment, selectable video programs are updated once a day to once a week. A satellite allows downlink on command such that desirable videos and commercials can be quickly inserted into a queue at the remote site.

The present invention provides an elaborate scheme for tracking information related to the selection of video programs. In a specific embodiment, each headend 110, 112, 114, 370 or 372 tracks which videos have been played for the subscriber groups associated with that headend and also which videos have been selected by subscribers within each group. This compiled information is then provided to the central site. This tracking of information also assists when an algorithm is being used to provide programming oriented to the tastes of the subscribers in a specific group.

Figure 5:
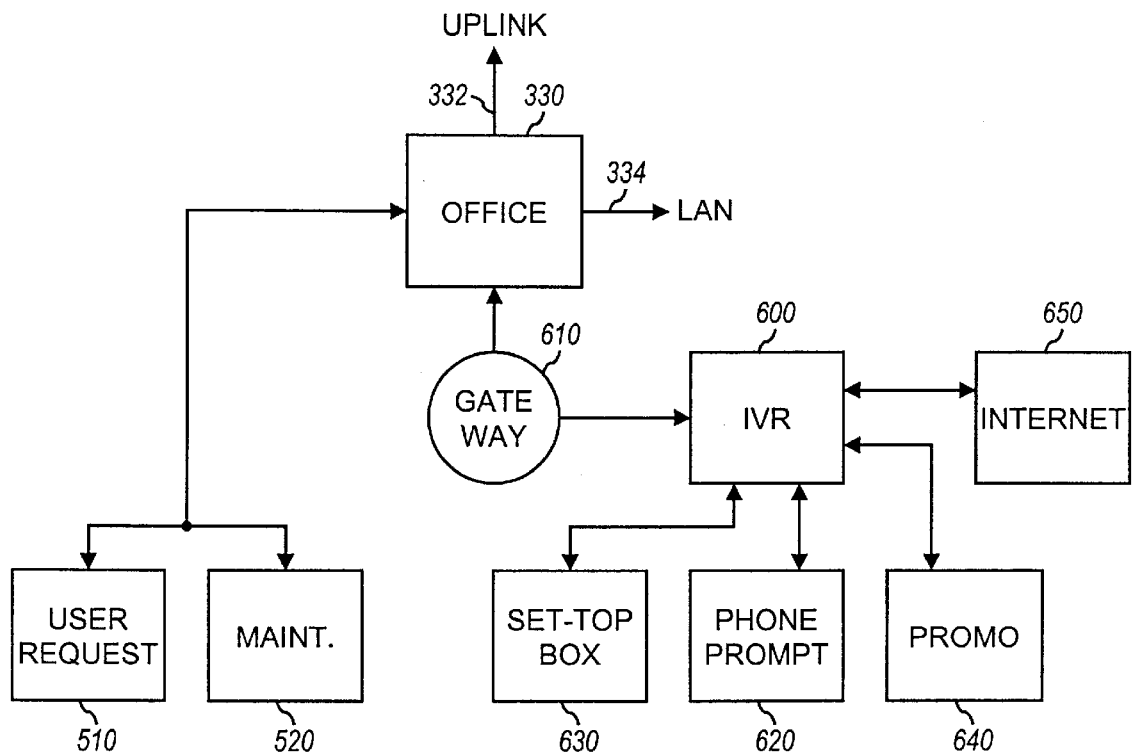
FIG. 5 provides a configuration for a central site in a first embodiment.

FIG. 5 provides a configuration for a central site in a first embodiment. Office 330 provides video programming via line 332 and an uplink to the satellites in the system and via line 334 to earth headends in the system. Office 330 can connect to any remote site (e.g., satellite or earth headend) on demand via lines 332 and 334. In a specific embodiment, line 334 connects to a LAN which provides connection to all earth headends in the system. Office 330 connects to remote sites under several different circumstances. For example, connection may be needed for performing maintenance checks 520 or for requesting information 510. Thus, office 330 has remote control over each remote site in the system. Line 334 can be a network connection (e.g., LAN), a dial-up modem, or the like. Maintenance checks 520 and user requests 510 are initiated by individuals who provide support to the system. These individuals are usually located at office 330.

When a user request 510 is initiated, only requests can be made to the satellite and earth headends in the system. Thus, no changes can be made to the information or software within these satellite and earth headends. In contrast, when a maintenance check 520 is initiated, a user can monitor and control any satellite or earth headends in the system remotely. Therefore, changes can be made to the information, software, scroll, etc. within these remote sites.

In one embodiment of the present invention, a software program is used to provide controlled access to the system to enable an authorized user to send digital messages between maintenance check 520 (or user request 510) and various remote sites in the system. When such an authorized user initiates a connection for a maintenance check 520 and/or for a user request 510, the authorized user requests connection to a particular remote site. At this point, the program begins a login process with that particular remote site. If a modem link is used, the login process takes approximately five to seven seconds. The software coordinates requested connections such that multiple users (e.g., eight users) can access one remote site through one link. Therefore, if one user is connected to a remote site and a second user initiates a connection to that same remote site, the software allows the second user to utilize the connection already established by the first user.

After obtaining a connection with one of the remote sites, the user can (1) input selections for more information related to that remote site, (2) input selections for maintenance purposes, (3) input a special message to a subscriber who is on the telephone, (4) input a new commercial for insertion into the video programming, (5) input a special message for the scroll, or the like, and (6) receive status and log information on remote activity. As the user inputs a selection, these inputs are shown on a computer screen in the remote site. After all the users are done accessing a particular remote site, the connection to that remote site is closed.

External request gateway 610 allows interactive-voice response (IVR) 600 to provide video selection and related information to office 330. Telephone prompt 620 allows for "1-800" and "1-900" numbers to be routed through IVR 600 and gateway 610 to office 330. In one telephone-prompting arrangement, a debit card with a PIN code is used such that anyone can call in directly to the system and request videos without having to provide a credit card number. Thus, debit cards and a database with customer information related to debit cards and PIN codes is present. This arrangement is desirable because (1) some individuals do not like to give their credit card number over the telephone, (2) some individuals do not like to receive "1-900" charges on their telephone bills, and (3) some subscribers do not have telephones or two-way cable boxes in their homes and this allows for the ordering of videos from pay phones. Selection information related to this method of requesting videos can be easily tracked by office 330.

Two-way set-top device information 630 can be provided through IVR 600 and gateway 610 to office 330. In this arrangement, a two-way set-top device is used in conjunction with a remote control in a subscriber's home. The remote control and prompts on the subscriber's television are used to select videos. The selection information is sent via RP signals to the company which provides the set-top device (e.g., a local cable company). This selection information is then provided to the remote site associated with the selecting subscriber's group and to office 330 via gateway 610. Office 330 uses this information for tracking video selections, etc. In an alternative embodiment, the selection information is sent by the set-top device provider to office 330, and in turn, office 330 sends the selection information to the remote site associated with the selecting subscriber's group.

According to another alternative embodiment, a cable provider's set-top device control system accepts orders from subscribers and submits them directly to the control computer which has a direct LAN connection to the set-top device control system at the cable headend. A proprietary protocol is used to submit orders. This protocol enables the set-top device control system to retrieve a valid list of videos from a video inventory in the control computer which is used for a number of purposes such as, for example, prompting subscribers within the set-top device environment, and validating subscriber orders.

Subscribers who respond to various promotions (these are usually included in a special scroll) can access the system via promotional connection 640 by calling a special "1-800" or "1-900" number. This is required so that a special routing of the order will be coordinated with the special scroll. Thus, the order can be handled by either an automated voice response created especially for the promotion or by an informed individual located at office 330.

Internet connection 650 relays subscriber selections which are made over the internet. In a specific embodiment, an accounting service within the internet is provided (1) through an internet company (e.g., America On-Line, CompuServe, and the like), (2) through an e-mail address, or (3) through a World Wide Web page. This accounting service requests the selected video program identification number along with a credit card number. The credit card number is used for the charge associated with the selecting of the video program. Thus, computers within the subscribers' homes can be used to order and display video programs.

Figure 6:
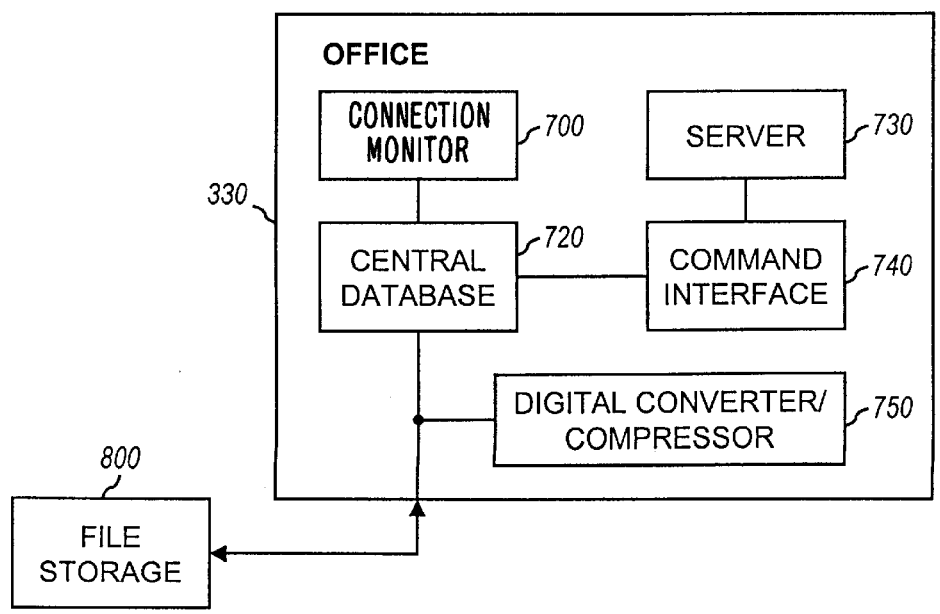
FIG. 6 provides a configuration within a central site.

FIG. 6 provides a configuration within a central site. Connection monitor 700, located within office 330, is a program which coordinates the sharing of one output line when multiple users request a connection to the same remote site. As stated above, users can connect to a remote site for user requests 510, maintenance checks 520, etc. Central database 720 contains a reference to all of the video programs in a structured database format along with a program which controls the organization of and access to the stored video programs. Information associated with the video programs is also included in central database 720. This information is usually the selection/request number for each video program, the title and artist when the video program is a music video, and other facts which describe the associated video program. Demographic preference information and other identifying information may also be associated with a video. In addition, central database 720 can be a dynamic database which tracks the data sent by a satellite. In this arrangement, central database 720 compares the data received at the remote site with the data sent to the satellite. Central database 720 can then order a resend of information from satellite 300 when data sent to a remote site is incomplete or incorrect (i.e., the received data does not match the data sent to the satellite). In an alternative embodiment, video programs can be stored in file storage 800. As shown in FIG. 6, file storage 800 is located outside of office 330.

Server 730 allows for connection between office 330 and a remote site via, for example, a network. When a fault condition occurs in a remote site, the server within that remote site automatically calls server 730 and requests maintenance for that fault condition. Software located in the remote site provides for the sequencing need for this automatic maintenance order. For example, a hard disk failure is reported to server 730 immediately. Thus, a server within each remote site works in conjunction with server 730. The remote site server can also act as a phone switch which collects data and sends the collected data out in one bunch. The collection of data only occurs for low priority actions.

The remote site contains a batch program which can organize and collect requests for this single transmission of collected data.

Command interface 740 allows office 330 (1) to send a particular video program to a particular remote site, (2) to delete a particular video from a particular remote site or from a group of remote sites, (3) to send a video program to a group of remote sites, etc. Command interface 740 uses server 730 to send and receive data from the remote sites. Digital converter/compressor 750 converts all the video programs into a digital format and then compresses it before the video programs are distributed to the remote sites. Digital converter/compressor 750 can be broken up into two separate units (i.e., one unit for converting and one unit for compressing).

As stated above, the mix of video programs sent to a particular remote site can be determined from an algorithm. This algorithm takes into consideration the types of video programs being selected by the subscriber group associated with that particular remote site. In other words, the demographics of an area can have an impact on which video programs are sent to a particular subscriber group for selection. This algorithm can be located in office 330. As information on videos for a particular subscriber group is received, the determination of which videos will be sent to the associated remote site is based on the selections made by the subscribers in that group. Thus, particular types of videos may be sent to a particular group of subscribers. In order to send a particular video to a remote site, an address identifying the remote site is assigned to that video.

Figure 7:
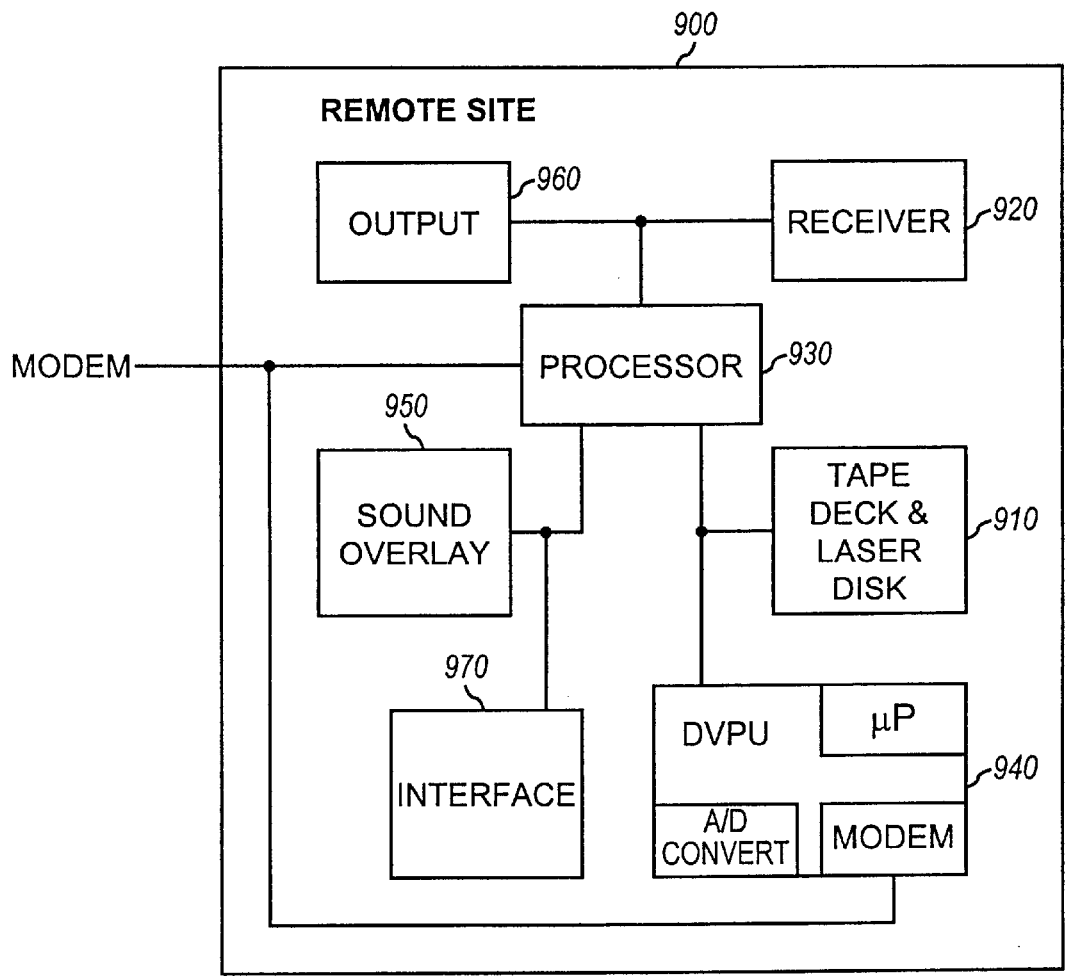
FIG. 7 provides a configuration for a remote site.

FIG. 7 provides a configuration for a remote site. In one embodiment of the present invention, remote site 900 includes a tape deck (e.g., ¾-inch) along with a laser disk player 910. The tape deck/laser disk arrangement 910 is usually used as a backup to digital video. In a specific embodiment, digital video is distributed either (1) on a storage medium (such as digital linear tape (DLT)) which is sent via overnight mail to the remote site, or (2) via a satellite transmission. When a DLT is used, the DLT usually has 20 gigabytes of storage capacity, and is a regular commercially-available DLT. In a specific embodiment, the DLT with updated video programs is sent to each remote site at least once a week. When a satellite transmission is used, the DLT can be used as a back-up.

When a satellite transmission is used, the digital video programs are transmitted to receiver 920 in an analog format. When processor 930 determines that the received data address matches the address of remote site 900, the received data are converted back into a digital form and stored in an Moving Picture Expert Group (MPEG) data compression format within digital video playback unit (DVPU) 940. In a specific embodiment, DVPU 940 has a hard disk with up to 64 gigabytes of capacity for storing the digitized video. DVPU 940 also stores the video programs in digital format when the digital video programs are received from DLT. Before broadcasting the digital video programs to subscribers, DVPU 940 decodes the compressed digital video programs such that they are broadcast in the original digital form.

The processor located within DVPU 940 can be a 486 or Pentium processor. This processor verifies the correct transfer of information from the satellite, and when an error occurs, automatically orders a dialback to request a re-transmit of data. The dialback is done through the modem inside DVPU 940. The dialback function is needed because of the one-way link between remote site 900 and office 330 when satellite 300 is used. Thus, the modem within 940 provides the dialback to uplink 340 such that a re-transmit can be ordered. Each frame of the digital video is checked and verified by DVPU 940, so that the exact frames which have problems can be re-transmitted after being ordered by DVPU 940. DVPU 940 can be created with standard equipment and custom software. The equipment within DVPU 940 includes a decoder board, a standard personal computer, and a satellite modem. This equipment is provided commercially by Scientific Atlanta. The custom software allows DVPU 940 (1) to efficiently store digital videos of variable length and (2) to defragment and organize the stored digital videos for later playing. In an alternative embodiment, a two-way link is employed in which case the dialback to request the retransmission is performed on the return path.

Processor 930 can be a 486 or Pentium processor which allows for high-quality scroll graphics along with a variety of scroll fonts, logos and colors. These graphics, etc. can be used in the scroll which is displayed on the subscribers' televisions. An overlay of a logo on the video programs is also possible. Furthermore, window fonts, fades, transparency and digital video effects (e.g., warps, page turns and zooms) can be displayed on the video programs. Processor 930 acts as a control unit which handles requests, builds queues with video programs and commercials, accepts multiple external inputs (some of which are described above), etc. The software used by processor 930 is divided into modules. Processor 930 uses the software to monitor modem connections, overlays, internet interaction, and the like.

Sound overlay 950 allows for the playing of videos without sound (i.e., when the sound for a video is deleted from that video) or when the audio from a promotion or the like is dubbed over the audio of the video program which is being broadcast. Output 960 allows for outputting information to, for example, a cable company which houses an earth headend. Output 960 also provides information on a computer screen which is coupled to remote site 900. Access to this computer screen is also available at each office and central location in system 10.

In a specific embodiment, the computer screen at the remote site 900 includes (1) a queue display with the identification number and length of time for each commercial, video program, etc. which is in the queue, (2) video switcher information which is used when the tape deck/laser disk 910 is being used, (3) the status of all modem lines and other lines which provide data to remote site 900, (4) the time left on the program which is presently being broadcast to the subscriber group, (5) the menu of available commands for remote site 900, (6) the equipment status for remote site 900, (7) the scroll which is located in the broadcast at that time, (8) the number of calls made each day for a specific period of time, (9) a log history which provides the video programs that have been selected for broadcast and the videos that have been broadcast (broadcast videos include those selected by subscribers along with those provided because no selections were made and the queue was empty).

Interface 970 within remote site 900 facilitates the connection between remote site 900 and the central site. In a specific embodiment, commercials are provided in stop sets having a duration of any desired length. Accordingly, video programs are placed in the queue to accommodate the scheduling of these commercial stop sets. Thus, stop sets are dynamically created at each remote site 900 when desired. This allows for localized commercial insertions which take into account the demographics associated with a subscriber group. Commercials can also be easily inserted when received via modem or some other type of transmission, including satellite.

In an alternative embodiment, a bi-directional satellite, located at the remote site, is used such that the verification done by DVPU 940 is not required, because verification is done by the bi-directional satellite. In addition, when a bi-directional satellite is located at the subscriber's location, a subscriber can transmit a selection via the bi-directional satellite and a remote control. Therefore, videos can be selected with a remote control when a two-way set-top device is not present. Bi-directional satellite of the very small aperture terminal (VSAT) type are provided commercially by, for example, AT&T, Tridom, Hughes Network System, and GE Space Net.

In yet another embodiment of the present invention, multiple continuous video programs may be provided to multiple subscriber groups from the same remote site. For example, two groups of subscribers in the same physical area may speak two different languages. Thus, two different channels which carry two different continuous video programs in different languages are desirable. When multiple subscriber groups are services by the same remote site, one DVPU 940 can provide the needed digital video programs and commercials to the multiple subscriber groups. Multiple boards within DVPU 940 are required in order to provide good video quality to up to eight subscriber groups simultaneously.

Figure 8:
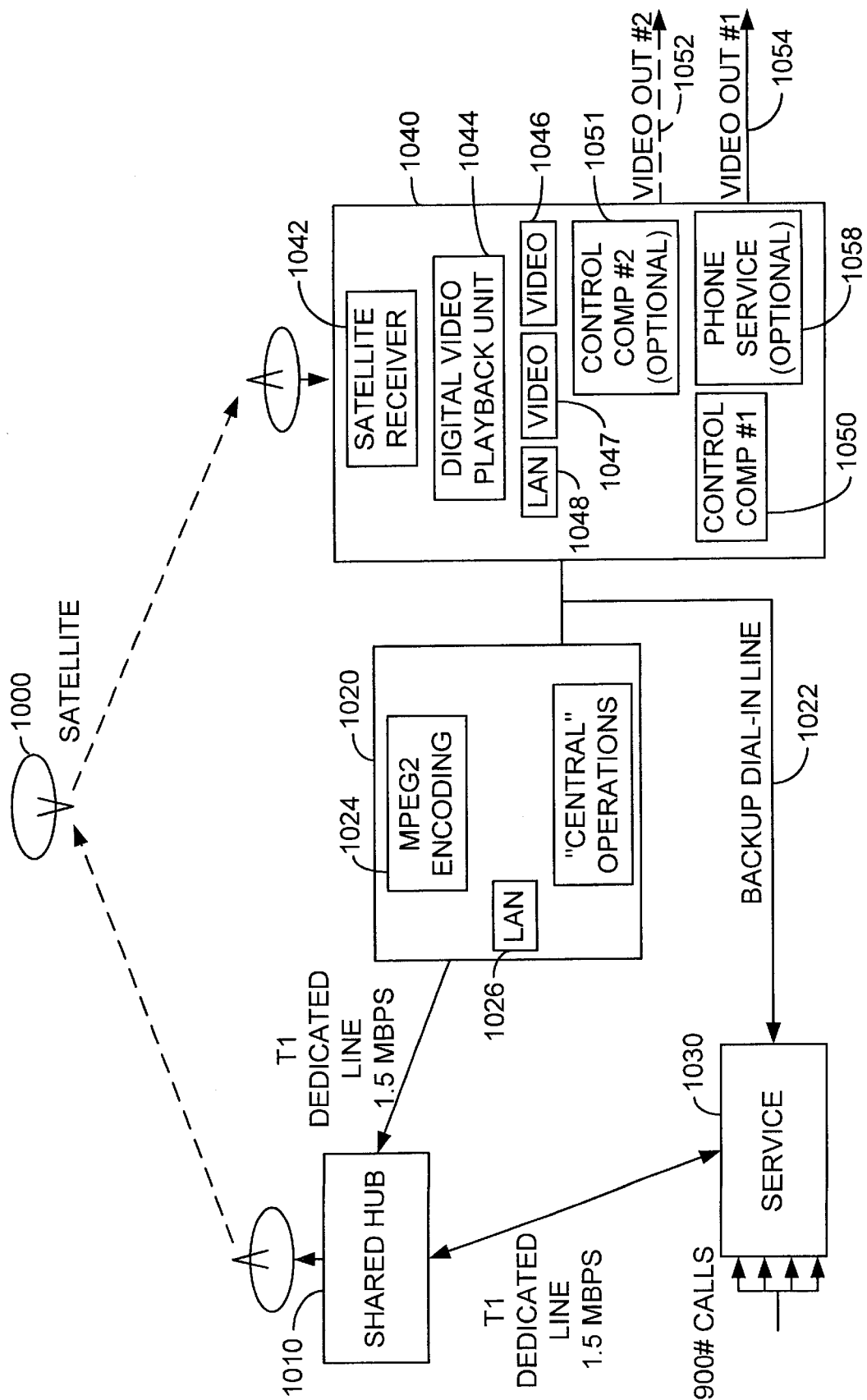
FIG. 8 illustrates an overall system architecture.

FIG. 8 illustrates an overall system architecture. Like the system structure in FIG. 4, this architecture utilizes satellite 1000. Shared Hub 1010 is an uplink to satellite 1000. Both central operations 1020 and service 1030 provide data and video to shared hub 1010 via T1 dedicated lines at 1.5 Mbps. "1-900" calls requesting videos are processed through service 1030 to shared hub 1010. The central office monitors communications to all sites over the primary data link (e.g., a two-way VSAT or WAN). If this communication path fails to any given site, communication to that site via a modem dial-up is enabled by phone service software 1058. However, to save phone toll charges, the modem/phone line is activated (i.e., a phone call is initiated) only in response to actual demand, e.g., a central office client request communication. The network connection is from the central office to each remote site. According to specific embodiments, WAN connections to the shared hub and to the phone service site can be redundant for fault tolerance.

At central operations 1020, video programming is encoded in an MPEG2 data compression format using MPEG2 encoding workstation 1024. All videos in this embodiment are transported, stored and played digitally with MPEG2 compression technology. These videos are distributed automatically via the 2-way satellite network connecting central operations 1020 to remote site 1040. Central Operations 1020 is also connected to a local area network via LAN 1026. This local area network allows access to various components in the system. Central operations 1020 acts as a translator for requests coming from various sources (e.g., Internet IVR).

Remote site 1040 receives videos through the 2-way satellite network via satellite receiver 1042. After the videos are received, they are downloaded and stored for future playback. Video storage units 1046 and 1047 are used to store the downloaded video. Digital video playback unit (DVPU) 1044 supports multiple playback channels 1054 and 1056, as described above with reference to FIG. 7. In a specific embodiment, videos are stored by grouping them on multiple hard drives. If a failure occurs on a hard drive unit, the videos stored on that drive are made unavailable to users. However, video request and playback continues for the videos remaining on the functional drives. In another embodiment, video file data is striped across multiple hard disk drives using RAID or other fault tolerant disk array implementations. If a hard drive failure occurs, this data redundancy across the drive array ensures that no video data is lost. According to various embodiments, remote site 1040 is also connected to the system's local area network via LAN 1048.

Control computer 1050 contains the software used for playing the videos and implementing the capabilities described above with reference to the various embodiments of the invention. In specific embodiments, this software provides the following capabilities: (1) commercial breaks are assembled and inserted into the video programming "on-the-fly" as discussed above, (2) automated video activation is possible at remote sites eliminating the need for human intervention at the remote sites, (4) video playback loops (random access in the digital video subsystem which allows the same video to be played repeatedly for a looping effect) and digital audio insertion (use of the audio subsystem to mix a computer generated audio source with the audio from the main video source) are options, (5) automatic real-time system failure alerting occurs as a result of monitoring and self-testing performed at all system levels; failure detections are logged and reported to the central office for handling by monitoring personnel, (6) multiple playback channels are supported as described with respect to FIG. 8, and (7) simultaneous system maintenance and playback occurs. Central operations 1020 accepts and routes alerts from remote systems (including remote site 1040), and logs all access to remote systems. Remote site 1040 may optionally include a second control computer 1051 for performing some of the functions described above or for operating in parallel with control computer 1050.

Figure 9:
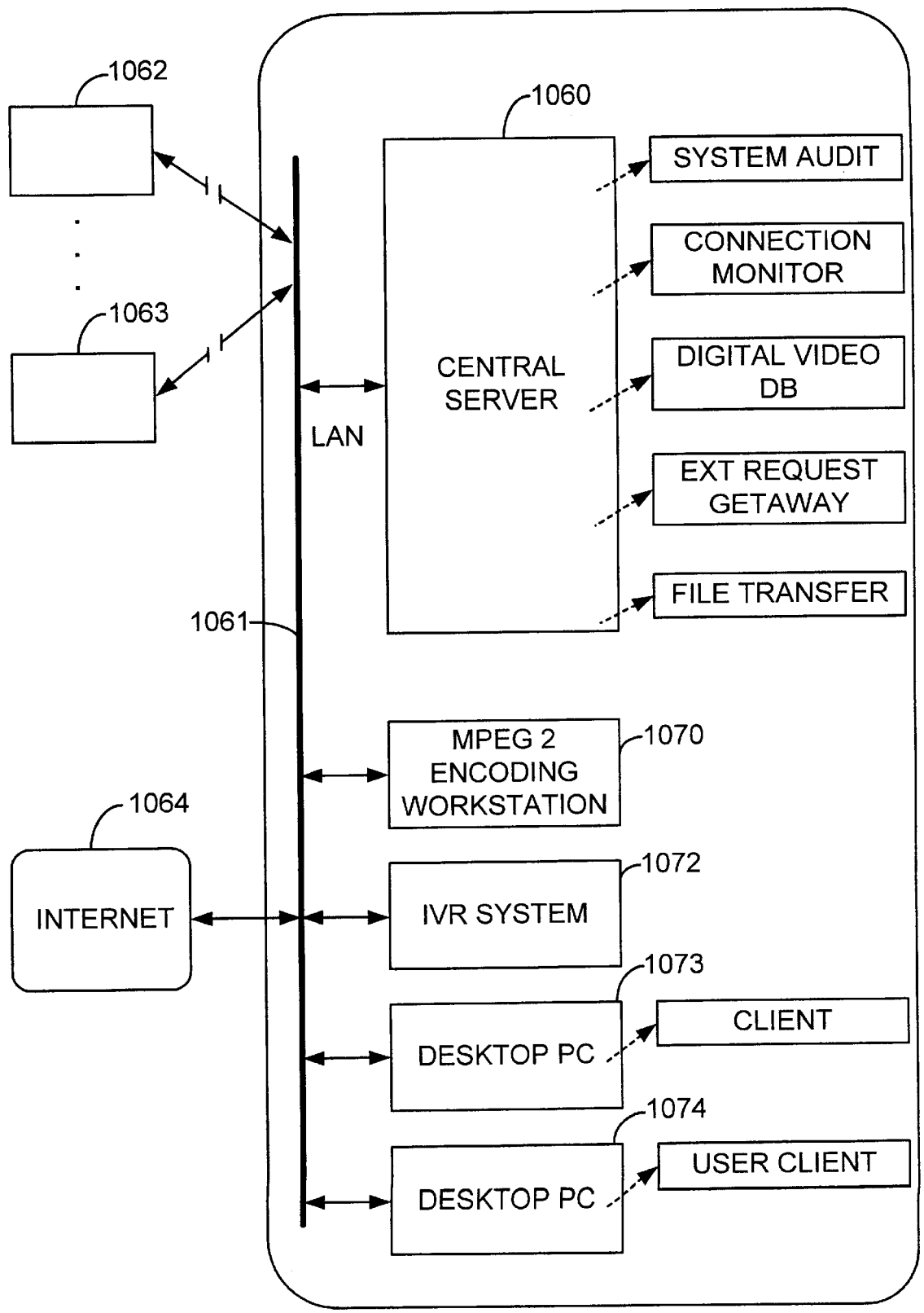
FIG. 9 provides a configuration for a technical computing system.

FIG. 9 provides a configuration for a technical computing system. In a specific embodiment, this technical computing system serves as the central operations. Central server 1060 provides various functions including the following: (1) system audits, (2) remote monitor and maintenance, (3) digital video transfer, (4) external request gateway operation, (5) file transfer, and (6) remote log transfer. Central server 1060 has access to other systems 1062 and 1063 and the Internet 1064 via LAN 1061. LAN 1061 also provides access to MPEG2 encoding workstation 1070, IVR system 1072, and desktop PCs 1073 and 1074. MPEG and IVR systems are discussed above. Desktop PCs 1073 and 1074 provide clients with access to central server 1060.

While a full and complete disclosure of the invention has been provided hereinabove, it will be apparent to those skilled in the art that various modifications and changes may be made.

What is claimed is:

1. A method for providing video programming to a group of subscribers comprising:
   creating a set of video programs;
   collecting historical information on previously ordered selections of video programs from said group of subscribers;
   determining a preferred type of video program based on said collected historical information;
   defining a broadcast program based at least in part on said determined preferred type of video program, wherein said broadcast program includes a subset of said created video programs;

receiving a subscriber selection from a selecting subscriber, said selecting subscriber being a member of said group of subscribers, said subscriber selection identifying one or more of video programs in said broadcast program as a subscriber-selected video program;

updating said broadcast program to include said subscriber selected video program; and broadcasting said updated broadcast program to said group of subscribers.

2. The method of claim 1 wherein said undated broadcast program includes a program segment having a content that is based in part on historical subscriber selection information of at least one member of said group of subscribers.

3. The method of claim 1 further comprising:

providing scroll information to said group of subscribers on an audio channel, said scroll information including video program identification information.

4. The method claim 1 wherein said updated broadcast program includes at least one of window fonts, fades, transparency, and digital video effects.

5. The method of claim 1 wherein said set of video programs is generated using MPEG-2 compression technology.

6. The method of claim 1 wherein said broadcasting is done with a satellite network.

7. The method of claim 1 further comprising:

providing software for assisting with said broadcasting of said updated broadcast program.

8. The method claim 1 further comprising:

assembling and inserting commercial breaks into said updated broadcast program.

9. The method of claim 1 further comprising:

providing a central server for providing various functions.

10. The method of claim 1 wherein said subscriber-selected video program in said updated broadcast program is ordered based in part on a relative order in which a plurality of subscriber selections are received, and in part on at least one other parameter.

11. The method of claim 10 wherein the at least one other parameter comprises a duration of the one or more selected video programs.

12. The method of claim 10 wherein the at least one other parameter comprises an amount paid by the selecting subscriber.

13. The method of claim 10 wherein the at least one other parameter comprises a number of subscriber-selected video programs included in said updated broadcast program.

14. The method of claim 10 wherein the at least one other parameter comprises a demographic profile of the group of subscribers.

15. The method of claim 10 wherein the at least one other parameter comprises insertion of commercial information into the updated broadcast program.

16. The method of claim 7 wherein said software is capable of scheduling a flexible video element for said updated broadcast program.

17. The method of claim 7 wherein said software is capable of providing automated video activation for said updated broadcast program.

18. The method of claim 7 wherein said software is capable of providing video playback loops.

19. The method of claim 7 wherein said software is capable of providing digital audio insertion for said updated broadcast program.

20. The method of claim 7 wherein said software is capable of providing automatic real-time system failure alerting.

21. The method of claim 7 wherein said software is capable of supporting multiple playback channels.

22. The method of claim 7 wherein said software is capable of providing simultaneous system maintenance and playback.

23. The method of claim 9 wherein one of said various functions provided by said central server comprises remote monitor and maintenance.

24. The method of claim 9 wherein one of said various functions provided by said central server comprises digital video transfer.

25. The method of claim 9 wherein one of said various functions provided by said central server comprises external request gateway operation.

26. The method of claim 9 wherein one of said various functions provided by said central server comprises file transfer.

27. The method of claim 9 wherein one of said various functions provided by said central server comprises remote log transfer.

28. The method of claim 1 wherein said subscriber selection is received via the Internet.

29. The method of claim 1 wherein said updated broadcast program is broadcast to the group of subscribers over the Internet.

30. The method of claim 1 further comprising:

distributing said broadcast program to a remote site by placing video programs in said broadcast program on digital audio tape and sending the digital audio tape with the video programs to the remote site.

31. The method of claim 1 further comprising:

displaying video program identification information to said subscribers on a background menu, wherein said subscribers can flip between said updated broadcast program and said background menu.

32. A method for providing video programming to a group of subscribers comprising:

creating a set of video programs;

collecting historical information on previous selections of video programs from said group of subscribers;

determining a preferred type of video program based on said collected historical information;

defining a broadcast program based at least in part on said determined preferred type of video program, wherein said broadcast program includes a subset of said created video programs;

receiving a first subscriber selection from a selecting subscriber, said selecting subscriber being a member of said group of subscribers, said first subscriber selection identifying one or more video programs in said broadcast program as a first subscriber-selected video program;

updating said broadcast program to include said first subscriber-selected video program, wherein said first subscriber-selected video program is ordered based in part on a relative order in which said first subscriber selection is received relative to other subscriber selections; and broadcasting said updated broadcast program to said group of subscribers.

33. A method for providing video programming to a group of subscribers comprising:

creating a set of video programs;

collecting historical information on previously ordered selections of video programs from said group of subscribers;

determining a preferred type of video program based on said collected historical information;

defining a broadcast program based at least in part on said determined preferred type of video program, wherein said broadcast program includes a subset of said created video programs;

receiving a subscriber selection from a selecting subscriber, said selecting subscriber being a member of said group of subscribers, said subscriber selection identifying one or more of said created video programs as a subscriber-selected video program;

updating said broadcast program to include said subscriber-selected video program;

arranging the order of said video programs in said updated broadcast program based on a set of criteria; and broadcasting said arranged broadcast program to said group of subscribers.

34. The method of claim 33, wherein said set of criteria includes at least one of: (1) a relative order in which a plurality of subscriber selections are received, (2) a duration of said one or more selected video programs, (3) an amount paid by said selecting subscriber, (4) a number of subscriber-selected video programs included in said updated broadcast program, and (5) a demographic profile of said group of subscribers.

35. The method of claim 33, wherein said set of video programs is generated using a compression technology.

36. The method of claim 33, further comprising:

assembling and inserting commercial breaks into said updated broadcast program.

37. The method of claim 33, wherein said subscriber selection is received via the Internet, a telephone, a television, or a combination thereof.

38. The method of claim 33, wherein said arranged broadcast program is broadcasted via the Internet, a satellite network, a video broadcast network, an audio broadcast network, a telephone network, a cable network, or a combination thereof.

* * * * *